(12) United States Patent
Awano

(10) Patent No.: US 11,164,158 B2
(45) Date of Patent: Nov. 2, 2021

(54) INFORMATION PROCESSING METHOD AND INFORMATION PROCESSOR

(71) Applicant: TOYOTA JIDOSHA KABUSHIKI KAISHA, Toyota (JP)

(72) Inventor: Hiroki Awano, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 16/294,352

(22) Filed: Mar. 6, 2019

(65) Prior Publication Data

US 2019/0287075 A1 Sep. 19, 2019

(30) Foreign Application Priority Data

Mar. 16, 2018 (JP) .............................. JP2018-050010

(51) Int. Cl.
  *G06Q 10/10* (2012.01)
  *G06Q 30/02* (2012.01)

(52) U.S. Cl.
  CPC ..... *G06Q 10/1095* (2013.01); *G06Q 30/0284* (2013.01)

(58) Field of Classification Search
  None
  See application file for complete search history.

(56) References Cited

U.S. PATENT DOCUMENTS

| 6,421,606 | B1* | 7/2002 | Asai | ................... | G01C 21/3423 |
| | | | | | 701/410 |
| 2004/0254721 | A1 | 12/2004 | Saiki | | |
| 2015/0045068 | A1* | 2/2015 | Soffer | ................... | G01C 21/20 |
| | | | | | 455/456.3 |
| 2017/0344010 | A1* | 11/2017 | Rander | .............. | G01C 21/3438 |
| 2019/0212155 | A1* | 7/2019 | Gordon | .................. | G01C 21/20 |

FOREIGN PATENT DOCUMENTS

| JP | 2003-130655 A | 5/2003 |
| JP | 2004-045333 A | 2/2004 |
| JP | 2005-017199 A | 1/2005 |

(Continued)

OTHER PUBLICATIONS

Aïvodji, Ulrich Aïvodji, et al. "Meeting points in ridesharing: A privacy-preserving approach." Transportation Research Part C: Emerging Technologies 72 (2016): 239-253 (Year: 2016).*

(Continued)

*Primary Examiner* — Patricia H Munson
*Assistant Examiner* — Marjorie Pujols-Cruz
(74) *Attorney, Agent, or Firm* — Oliff PLC

(57) ABSTRACT

In an information processor, an acquirer acquires a departure point and transportation of each of multiple users and a destination in common. A provisional setting unit provisionally sets a meeting place multiple times. For the meeting place provisionally set each time, a calculation unit derives a travel cost of each user required for traveling from the departure point of the user through the meeting place to the destination, and a join cost of each user required for joining at the meeting place based on the transportation of the user, and calculates the sum of the travel costs and the join costs of the respective users. Based on the multiple calculated sums, a formal setting unit formally sets a meeting place.

8 Claims, 7 Drawing Sheets

(56) References Cited

FOREIGN PATENT DOCUMENTS

| JP | 2005-083864 A | 3/2005 |
| JP | 2008-122157 A | 5/2008 |
| JP | 2008-268080 A | 11/2008 |
| JP | 2013-096923 A | 5/2013 |
| JP | 2014-048081 A | 3/2014 |

OTHER PUBLICATIONS

Aïvodji, Ulrich Matchi, Sébastien Gambs, Marie-José Huguet, and Marc-Olivier Killijian. "Meeting points in ridesharing: A privacy-preserving approach." Transportation Research Part C: Emerging Technologies 72 (2016): 239-253 (Year: 2016).*

Kazuki Takise et al; "Multi-user Routing to Single Destination with Confluence"; DEIM Forum 2016 D2-6; 8 pgs total.

* cited by examiner

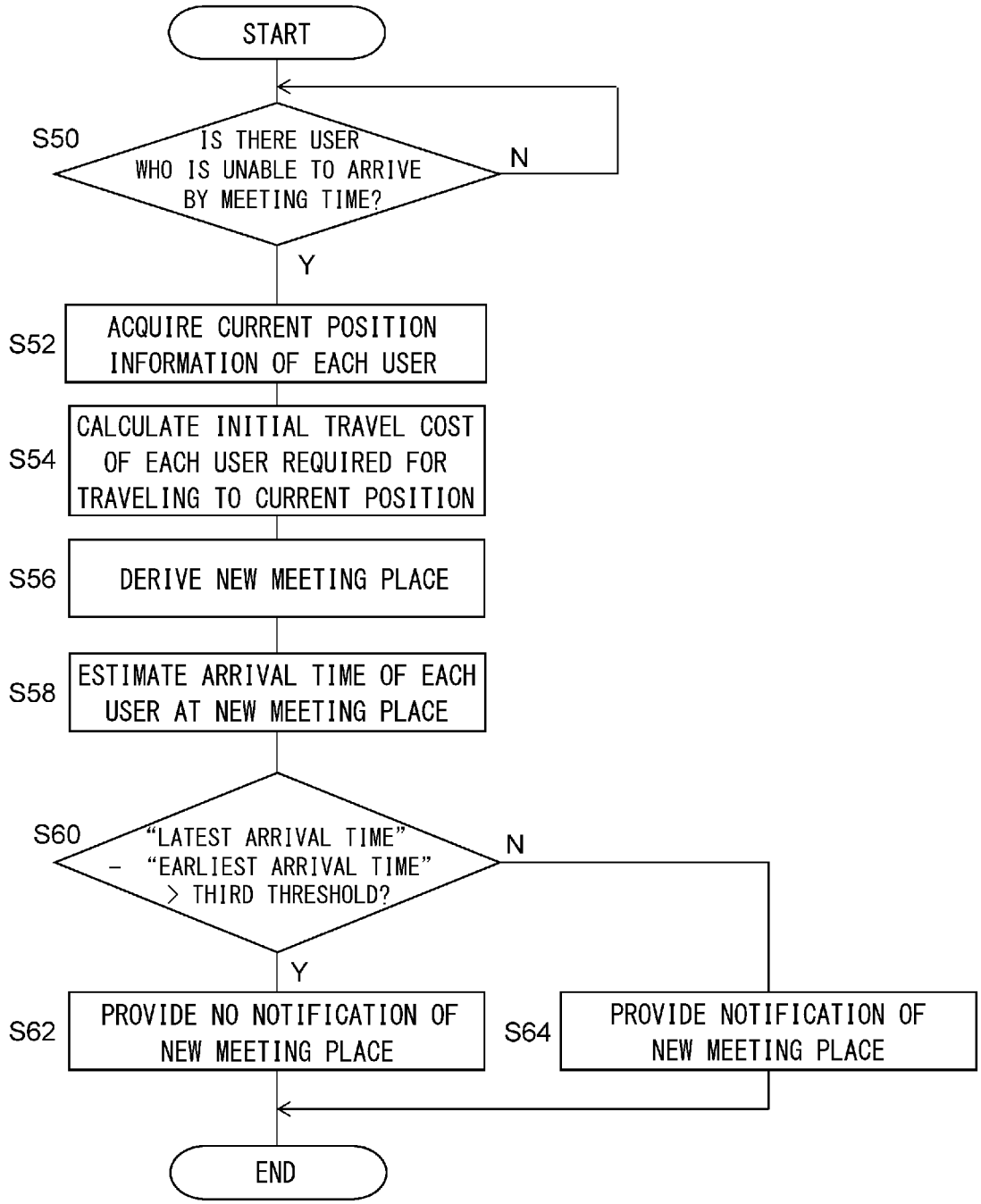

INFORMATION PROCESSING METHOD AND INFORMATION PROCESSOR

The disclosure of Japanese Patent Application No. 2018-050010 filed on Mar. 16, 2018 including the specification, drawings and abstract is incorporated herein by reference in its entirety.

BACKGROUND

1. Technical Field

The present disclosure relates to an information processing method and an information processor for setting a meeting place for multiple users.

2. Description of Related Art

A known technology proposes a meeting place for multiple users who have arranged to meet and head for the destination. JP-A-2013-96923 discloses a system that extracts multiple candidate places for a meeting place for multiple users, searches for routes to the multiple candidate places for each user, calculates the route difficulty level for each candidate place, and sets a meeting place based on the difficulty level.

If there are only users who travel by foot or by train, they can meet up at a terminal station or the like; however, if there is also a user who travels by car, their meeting up at such a place will be difficult. With the technology described in JP-A-2013-96923, handling such a situation is difficult.

SUMMARY

The present embodiment addresses the above-described issue, and a general purpose thereof is to provide an information processing method and an information processor for deriving an appropriate meeting place even when there is a user who uses different transportation.

In response to the above issue, an information processing method of one aspect of the present embodiment includes: acquiring a departure point and transportation of each of a plurality of users and a destination in common; provisionally setting a meeting place a plurality of times; deriving, for the meeting place provisionally set each time, a travel cost of each user required for traveling from the departure point of the user through the meeting place to the destination, and a join cost of each user required for joining at the meeting place based on the transportation of the user, and calculating the sum of the travel costs and the join costs of the respective users; and formally setting a meeting place based on a plurality of calculated sums.

According to this aspect, the join cost of each user required for joining at the meeting place is derived based on the transportation of the user, and the sum of the travel costs and the join costs of the respective users is calculated. Therefore, even when there is a user who uses different transportation, an appropriate meeting place can be derived.

The information processing method may further include: acquiring current position information of the plurality of users; deriving, when there is a specific user thought to be unable to arrive at the meeting place formally set by a predetermined meeting time, for the meeting place provisionally set each time in the provisionally setting, the travel cost of each user required for traveling from the current position of the user through the meeting place to the destination, and newly calculating the sum of the travel costs and the join costs of the respective users; and formally setting, based on a plurality of sums newly calculated, a new meeting place such that the travel cost required for the specific user to travel from the current position of the specific user to the new meeting place is higher than the travel cost required for each of the other users to travel from the current position of the user to the new meeting place.

Another aspect of the present embodiment relates to an information processor. The information processor includes: an acquirer configured to acquire a departure point and transportation of each of a plurality of users and a destination in common; a provisional setting unit configured to provisionally set a meeting place a plurality of times; a calculation unit configured to derive, for the meeting place provisionally set each time, a travel cost of each user required for traveling from the departure point of the user through the meeting place to the destination, and a join cost of each user required for joining at the meeting place based on the transportation of the user, and to calculate the sum of the travel costs and the join costs of the respective users; and a formal setting unit configured to formally set a meeting place based on a plurality of calculated sums.

According to this aspect, the join cost of each user required for joining at the meeting place is derived based on the transportation of the user, and the sum of the travel costs and the join costs of the respective users is calculated. Therefore, even when there is a user who uses different transportation, an appropriate meeting place can be derived.

The information processor may further include a position information acquirer configured to acquire current position information of the plurality of users. When there is a specific user thought to be unable to arrive at the meeting place formally set by a predetermined meeting time, the calculation unit may derive, for the meeting place provisionally set each time by the provisional setting unit, the travel cost of each user required for traveling from the current position of the user through the meeting place to the destination, and may newly calculate the sum of the travel costs and the join costs of the respective users. The formal setting unit may formally set, based on a plurality of sums newly calculated, a new meeting place such that the travel cost required for the specific user to travel from the current position of the specific user to the new meeting place is higher than the travel cost required for each of the other users to travel from the current position of the user to the new meeting place.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 9 is a flowchart that shows processing for changing the meeting place, performed in the server device shown in FIG. 1.

DETAILED DESCRIPTION

Various embodiments now will be described. The embodiments are illustrative and are not intended to be limiting.

Figure 1:
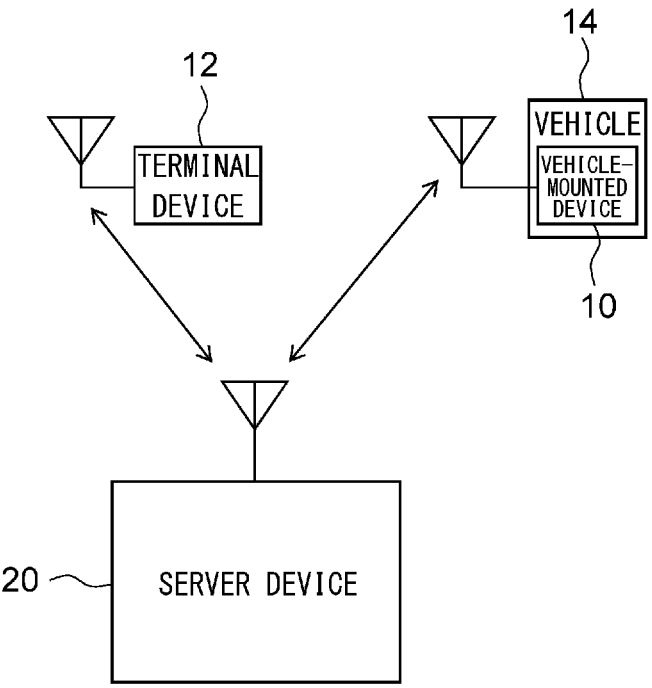
FIG. 1 is a block diagram that shows a configuration of an information provision system according to an embodiment.

FIG. 1 is a block diagram that shows a configuration of an information provision system 1 according to an embodiment. The information provision system 1 includes a vehicle-mounted device 10, a terminal device 12, and a server device 20. Although the embodiment describes an example in which one vehicle-mounted device 10 and one terminal device 12 are provided in the interest of clarity, the information provision system 1 may include multiple vehicle-mounted devices 10 and multiple terminal devices 12. Also, the information provision system 1 need not include the terminal device 12 if multiple vehicle-mounted devices 10 are provided, or need not include the vehicle-mounted device 10 if multiple terminal devices 12 are provided.

The vehicle-mounted device 10 is mounted on a vehicle 14, which is an automobile, and configured as a navigation device or the like. The vehicle-mounted device 10 performs wireless communication with the server device 20. The driver of the vehicle 14 is referred to as a first user.

The terminal device 12 is a portable device, such as a smartphone, cellular phone, tablet terminal, notebook computer, and wearable terminal, carried by a second user, who is different from the first user. The terminal device 12 performs wireless communication with the server device 20.

Based on the departure point and the transportation of each of multiple users and a destination in common transmitted from the vehicle-mounted device 10 and the terminal device 12, the server device 20 derives a meeting place on a traveling route to the destination and provides information regarding the meeting place and facilities therearound. The server device 20 may be installed in a data center, for example.

An example will be described in which the first user drives a vehicle 14 to a meeting place, the second user goes to the meeting place by train, and the second user then rides together in the vehicle 14 to head for the destination from the meeting place. The number of users may be three or more, and multiple meeting places may be set. Assuming the case of touring, for example, each user may drive a vehicle, such as a motorcycle to a meeting place, such as a service area on an expressway, and the multiple users may drive the respective vehicles to head for the destination from the meeting place.

The vehicle-mounted device 10 regularly acquires current position information of the subject vehicle, on which the vehicle-mounted device 10 is mounted, and transmits the current position information to the server device 20. The current position information may be acquired from a GPS receiver, not illustrated, provided on the vehicle 14, for example. To the current position information, information for identifying the vehicle 14 as the transmission source is attached.

The terminal device 12 regularly acquires its own current position information and transmits the current position information to the server device 20. The current position information may be acquired from a GPS receiver, not illustrated, provided on the terminal device 12, for example. To the current position information, information for identifying the terminal device 12 as the transmission source is attached.

The terminal device 12 may accept, from the second user, an entry of meeting event information used when multiple users arrange to meet and head for the destination. The meeting event information includes the destination, the date and time of arrival at the destination, the departure point of the second user, the transportation of the second user, and information regarding another user invited for the meeting event. It is assumed here that the another user is the first user of the vehicle-mounted device 10. Meanwhile, the vehicle-mounted device 10 may accept an entry of meeting event information from the first user. In this case, processing performed in the vehicle-mounted device 10 and processing performed in the terminal device 12 described below will be reversed.

Figure 2:
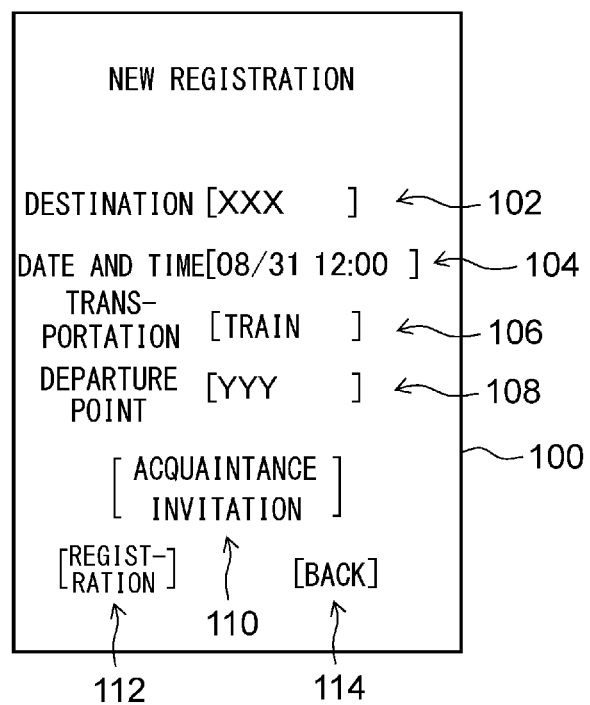
FIG. 2 is a diagram that shows an entry screen regarding meeting event information, displayed on a terminal device shown in FIG. 1.

FIG. 2 shows an entry screen 100 regarding meeting event information, displayed on the terminal device 12 shown in FIG. 1. For example, when a meeting setting button is operated on a menu screen, not illustrated, displayed on the display of the terminal device 12, the entry screen 100 is displayed on the terminal device 12. The entry screen 100 includes an entry field 102 for the destination, an entry field 104 for the date and time of arrival at the destination, an entry field 106 for the transportation, an entry field 108 for the departure point, an acquaintance invitation button 110, a registration button 112, and a back button 114. When the acquaintance invitation button 110 is operated, another user to be invited for the meeting event can be specified. When the registration button 112 is operated, the terminal device 12 transmits the entered meeting event information to the server device 20, for the registration of the meeting event. When the back button 114 is operated, the terminal device 12 displays the menu screen.

Based on the information regarding another user invited for the meeting event included in the event information received from the terminal device 12, the server device 20 transmits an invitation notification to the vehicle-mounted device 10 related to the another user.

Figure 3:
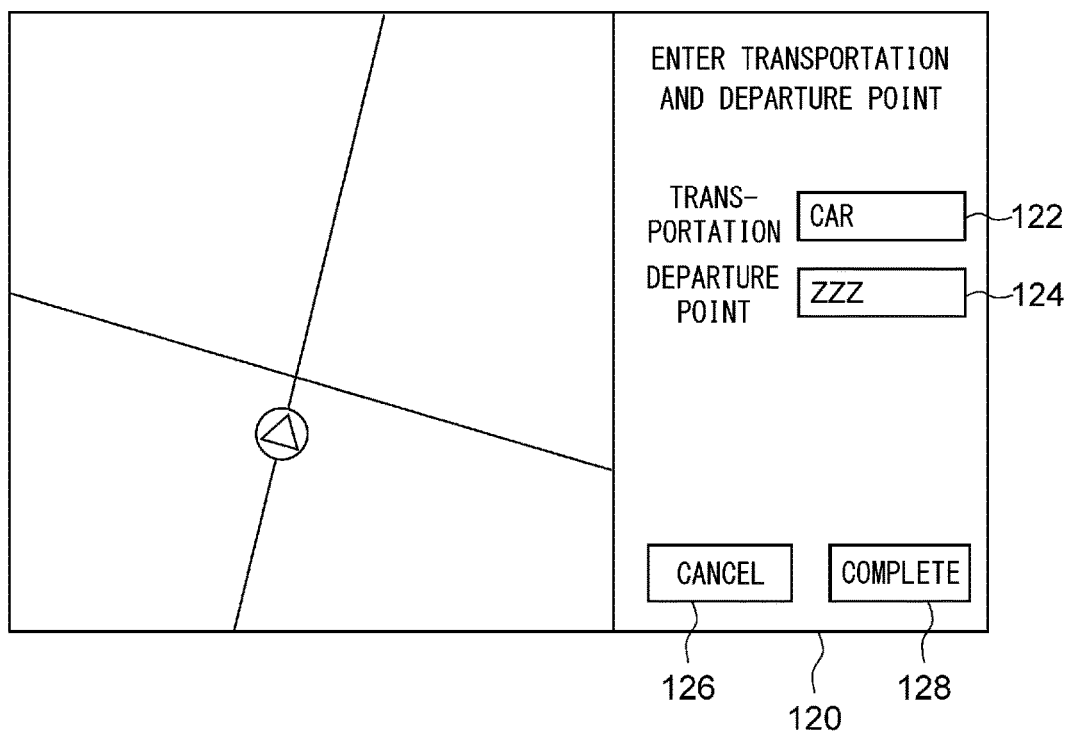
FIG. 3 is a diagram that shows an entry screen regarding meeting information, displayed on a vehicle-mounted device shown in FIG. 1.

Upon reception of the invitation notification, the vehicle-mounted device 10 displays an invitation notification screen on its display and accepts, from the first user, an entry regarding whether or not the first user can participate. The invitation notification screen may include, for example, the message of "Received invitation from BBB", the destination, the date and time of arrival at the destination, a "Can participate" button, and a "Cannot participate" button. When the "Can participate" button is operated, an entry screen regarding meeting information shown in FIG. 3 is displayed on the vehicle-mounted device 10 to accept an entry regarding the meeting information from the first user. The meeting information includes the transportation to the meeting place and the departure point. When the "Cannot participate" button is operated, the vehicle-mounted device 10 transmits, to the server device 20, information indicating that the first user cannot participate.

FIG. 3 shows an entry screen 120 regarding meeting information, displayed on the vehicle-mounted device 10 shown in FIG. 1. The entry screen 120 is superimposed on the information displayed at the time, such as a map for route guidance. The entry screen 120 includes an entry field 122 for the transportation, an entry field 124 for the departure point, a cancel button 126, and a complete button 128. When the complete button 128 is operated, the vehicle-mounted device 10 transmits the entered meeting information to the server device 20. When the cancel button 126 is operated, the vehicle-mounted device 10 displays the invitation notification screen again.

Based on the meeting information received from the vehicle-mounted device 10 and the meeting event information, the server device 20 derives a meeting place.

Figure 4:
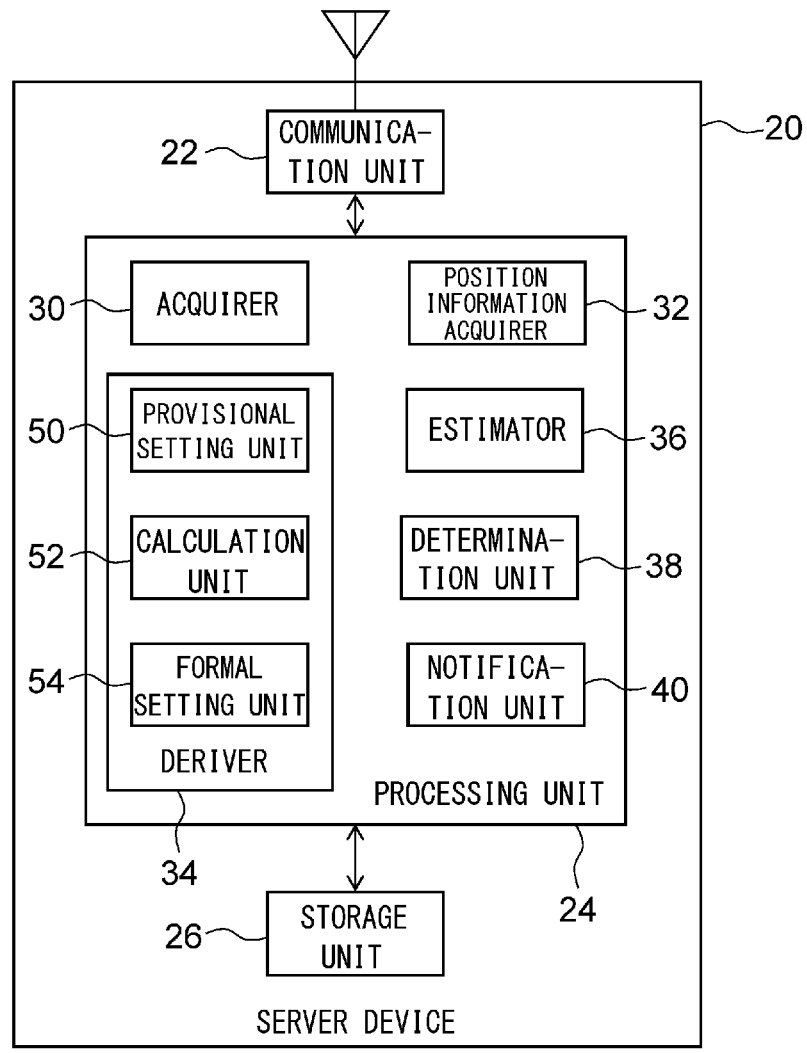
FIG. 4 is a block diagram that shows a configuration of a server device shown in FIG. 1.

FIG. 4 is a block diagram that shows a configuration of the server device 20 shown in FIG. 1. The server device 20 includes a communication unit 22, a processing unit 24, and a storage unit 26. The processing unit 24 includes an acquirer 30, a position information acquirer 32, a deriver 34, an estimator 36, a determination unit 38, and a notification unit 40. The deriver 34 includes a provisional setting unit 50, a calculation unit 52, and a formal setting unit 54. The processing unit 24 functions as an information provision device. The deriver 34 functions as an information processor.

The configuration of the processing unit 24 may be implemented by a CPU or memory of any given computer, an LSI, or the like in terms of hardware, and by a memory-loaded program or the like in terms of software. In the present embodiment is shown a functional block configuration realized by cooperation thereof. Therefore, it would be understood by those skilled in the art that these functional blocks may be implemented in a variety of forms by hardware only, software only, or a combination thereof.

The communication unit 22 performs wireless communication with the vehicle-mounted device 10 and the terminal device 12. The communication unit 22 receives the current position information and various pieces of information from each of the vehicle-mounted device 10 and the terminal device 12.

The acquirer 30 acquires the departure point and the transportation of each of multiple users, the destination, and the date and time of arrival at the destination received at the communication unit 22. Also, the position information acquirer 32 acquires the current position information of each of multiple users received at the communication unit 22.

The storage unit 26 stores information such as map data. The map data includes information regarding public transportation, such as trains and buses, information regarding parking areas, facility information, and the like. The information regarding public transportation includes information regarding timetables and fares of public transportation.

Based on the information stored in the storage unit 26, the departure point and the transportation of each of multiple users and the destination acquired by the acquirer 30, the deriver 34 derives a meeting place where users meet up on a traveling route to the destination. The processing for deriving a meeting place will be described later. The deriver 34 determines the transportation from the meeting place to the destination. The transportation from the meeting place to the destination may be specified by the user in advance.

Based on the transportation from the meeting place to the destination, the deriver 34 determines the meeting time at the meeting place such that the users can arrive at the destination on the date and time of arrival at the destination.

The estimator 36 estimates the arrival time of each user at the meeting place based on the user's transportation such that the user can arrive at the meeting place by the meeting time determined by the deriver 34. For example, when the transportation is by train, the arrival time at the meeting place may be 20 minutes before the meeting time, or may be several minutes before the meeting time, depending on whether or not transfer is required, the number of trains operated, and the like. Based on the estimated arrival time of each user at the meeting place, the estimator 36 determines the departure time of each user.

Based on the arrival time estimated by the estimator 36, the determination unit 38 determines a notification target user to be notified of guidance regarding facilities around the meeting place. When the time from the arrival time of a user estimated by the estimator 36 to a predetermined meeting time is a first threshold or greater, the determination unit 38 sets the user as a notification target user. The first threshold is appropriately determined and may be a value between 10 minutes and 15 minutes, for example.

The determination unit 38 sets, as a notification target user, a user whose transportation is by car, irrespective of the arrival time estimated by the estimator 36. This is because the actual arrival time of a user traveling by car could greatly differ from the estimated arrival time, and the user may be more likely to arrive before the estimated arrival time, compared to a user traveling by train.

Based on the map data stored in the storage unit 26 and the transportation of the notification target user determined by the determination unit 38, the notification unit 40 notifies the notification target user of guidance regarding facilities around the meeting place. The facilities around the meeting place may be a coffee shop, a fast-food restaurant, a bookstore, and other facilities where the user can comfortably spend time while waiting. When the transportation of the notification target user is by car, the facilities around the meeting place may desirably include parking areas. The notification unit 40 allows the communication unit 22 to transmit information regarding the guidance to at least one of the terminal device 12 and the vehicle-mounted device 10 of the notification target user. The notification unit 40 also allows the communication unit 22 to transmit information including the meeting place, departure time, meeting time, and route, to the terminal devices 12 and the vehicle-mounted devices 10 of multiple users.

Each of the vehicle-mounted devices 10 and the terminal devices 12 receives the information transmitted from the communication unit 22 and displays information regarding the meeting place based on the information thus received.

Figure 5:
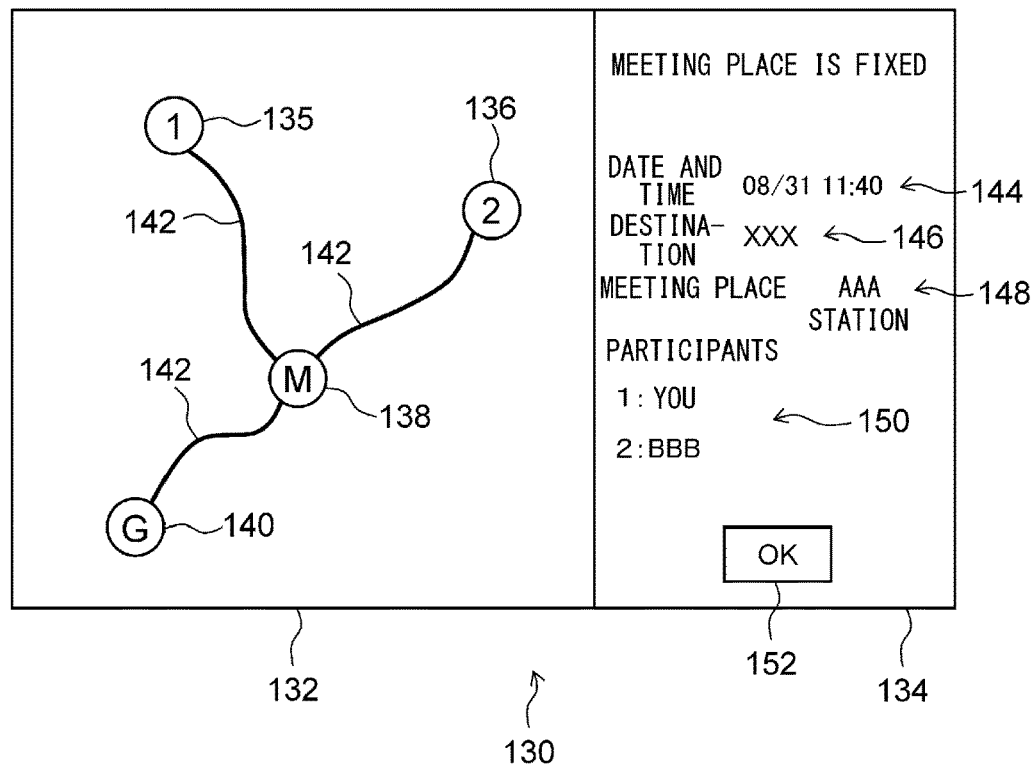
FIG. 5 is a diagram that shows a notification screen regarding a meeting place, displayed on the vehicle-mounted device shown in FIG. 1.

FIG. 5 shows a notification screen 130 regarding a meeting place, displayed on the vehicle-mounted device 10 shown in FIG. 1. The notification screen 130 includes a map 132 and textual information 134 regarding the meeting place. The map 132 includes a departure point 135 of the first user, a departure point 136 of the second user, a meeting place 138, a destination 140, and routes 142. The textual information 134 regarding the meeting place includes meeting date and time 144, a destination 146, a meeting place 148, and participants 150. The textual information 134 may also include the departure time.

When an OK button 152 displayed on the notification screen 130 is operated and when the vehicle-mounted device 10 has received the guidance regarding facilities around the meeting place, the vehicle-mounted device 10 displays a notification screen regarding facilities around the meeting place.

Figure 6:
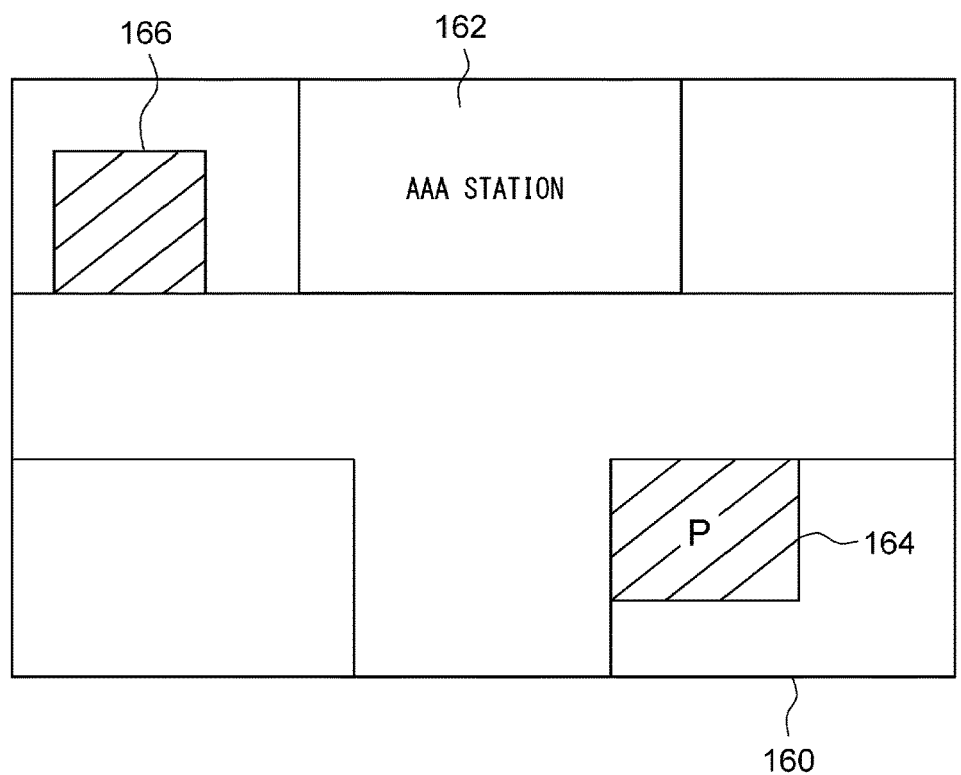
FIG. 6 is a diagram that shows a notification screen regarding facilities around a meeting place, displayed on the vehicle-mounted device shown in FIG. 1.

FIG. 6 shows a notification screen 160 regarding facilities around a meeting place, displayed on the vehicle-mounted device 10 shown in FIG. 1. The notification screen 160 includes an enlarged map of the vicinity of a meeting place 162 and facilities displayed on the enlarged map. As the facilities, a parking area 164 and a coffee shop 166 are highlighted in FIG. 6. Accordingly, the first user can find that he or she can park the vehicle in the parking area 164 to wait for the second user.

For example, when the second user's arrival time at the meeting place is estimated to be 20 minutes before the meeting time, notification of the guidance regarding the facilities related to the coffee shop 166 is also provided to the terminal device 12 of the second user. When the second user's arrival time at the meeting place is estimated to be about 5 minutes before the meeting time, on the other hand, notification of the guidance regarding the facilities is not provided to the terminal device 12 of the second user. It is considered that, for about 5 minutes, users can easily wait without using facilities.

Also, while users are traveling toward the meeting place on the day of the meeting, the estimator 36 estimates the arrival time of each user at the meeting place based on the current position information and the transportation of the user. A user who has not been notified of the guidance regarding facilities may leave earlier on the day of the meeting, for example, and the arrival time of the user may become earlier. Accordingly, also on the day of the meeting, the determination unit 38 determines a notification target user to be notified of the guidance based on the arrival time estimated by the estimator 36. The notification unit 40 then notifies, of the guidance regarding facilities, the notification target user thus determined on the day of the meeting.

Also, when the time from the meeting time to the arrival time of a user estimated by the estimator 36 on the day of the meeting is a second threshold or greater, the determination unit 38 sets the user as a specific user who is thought to be unable to arrive at the meeting place by the meeting time. The second threshold is appropriately determined and may be a value between 15 minutes and 30 minutes, for example. The estimator 36 may estimate the arrival time at the meeting place based on traffic congestion information and public transportation delay information acquired via the Internet, which is not illustrated.

When there is such a specific user, the deriver 34 derives a new meeting place. The estimator 36 then estimates the arrival time of each user at the new meeting place. When the difference between "the latest arrival time" and "the earliest arrival time" in the estimated arrival times of the users is a third threshold or less, the notification unit 40 notifies, via the communication unit 22, the vehicle-mounted devices 10 and the terminal devices 12 of information regarding the new meeting place. When the difference between "the latest arrival time" and "the earliest arrival time" is greater than the third threshold, the notification unit 40 does not provide notification of information regarding the new meeting place. It is considered that, when the difference of arrival time between the users is too large, there is no benefit in changing the meeting place. The third threshold is appropriately determined and may be a value between 5 minutes and 15 minutes, for example. Each of the vehicle-mounted devices 10 and terminal devices 12 that have received information regarding the new meeting place displays a change proposal screen regarding the meeting place, on which the new meeting place is specified. The change proposal screen includes information indicating that the specific user will arrive late. If all the users participating in the meeting event agree on the new meeting place, the new meeting place will be fixed. The processing for deriving a new meeting place will also be detailed later.

Also, before the meeting date or on the day of the meeting, users can check the meeting place. On each of the vehicle-mounted devices 10 and the terminal devices 12, when a meeting schedule button on the menu screen, not illustrated, is operated, for example, a list of meeting places for multiple meeting events in which the user is to participate are displayed. In the following, the case of the vehicle-mounted device 10 will be described.

When a meeting place is selected in the list, the vehicle-mounted device 10 displays a map including the meeting place thus selected. When the time left before the meeting time becomes a certain period of time or less, the vehicle-mounted device 10 receives from the server device 20 the current position of another user who has permitted the disclosure of position information, and displays the current position on the map. Therefore, the user of the vehicle-mounted device 10 can comprehend the current meeting state of other users.

When a details button displayed on the map is operated, the vehicle-mounted device 10 displays an enlarged map of the vicinity of the meeting place. When the vehicle-mounted device 10 has received the guidance, the enlarged map includes facilities of which the vehicle-mounted device 10 has been notified, similarly to the notification screen 160 shown in FIG. 6. Accordingly, a user who is likely to arrive at the meeting place earlier on the day of the meeting can check facilities where the user can comfortably spend time while waiting.

(Processing for Deriving Meeting Place)

There will now be described the processing for deriving a meeting place performed in the deriver 34. Based on the map data stored in the storage unit 26, the provisional setting unit 50 provisionally sets a meeting place multiple times. For the meeting place thus provisionally set each time, the calculation unit 52 derives a travel cost of each user required for traveling from the departure point of the user through the meeting place to the destination, and a join cost of each user required for joining at the meeting place based on the transportation of the user; thereafter, the calculation unit 52 calculates the sum of the travel costs and the join costs of the respective users. The travel costs and the join costs are stored in the storage unit 26 in advance.

The travel cost required when a user travels solely may be calculated as follows, for example. When the transportation is by car, the travel cost can be calculated by (unit fuel price)×(distance)/(fuel economy)+(wage per unit time)×(distance)/(vehicle speed). When the transportation is by train, bus, or other public transportation, the travel cost can be calculated by (base fare)+(distance)×(fare rate). When the transportation is by foot, the travel cost can be calculated by (wage per unit time)×(distance)/(walking speed). For a user whose walking speed is relatively low, such as an elderly person, the travel cost required when the transportation is by foot is relatively high. Accordingly, a meeting place may be derived such that the distance for which an elderly person, for example, travels by foot becomes relatively short.

The travel cost required for users to travel from a meeting place to a destination is lower than the travel cost required when each user solely travels along the same route. Namely, for a given route, the travel cost is lower when users meet up and travel in a group, compared to the case where each user solely travels.

For one meeting place, multiple join costs are set for the respective types of transportation of a user. The join cost of a meeting place unsuitable for meeting may be set to infinity or the like. The join cost of a meeting place suitable for meeting is set relatively small. For example, when the transportation is by car, the join cost of a place where parking and stopping of vehicles is impossible or difficult, such as an expressway interchange, a terminal station, and a place with no parking area in a downtown area, may be set to infinity or the like. Also, when the transportation is by car, the join cost of a place with a parking area may be set lower if the parking fee per unit time of the parking area is lower. When the transportation is by train, the join cost of a meeting place suitable for meeting, such as a station, commercial facilities near a station, and a landmark, is set lower.

Based on the multiple sums thus calculated, the formal setting unit 54 formally sets a meeting place. More specifically, the formal setting unit 54 formally selects a meeting place with the minimum sum. The processing described above corresponds to deriving, by the deriver 34, a meeting place.

The processing for deriving a meeting place as set forth above may be expressed as processing for minimizing an objective function $dp(U,v_T)$ defined by the following Equation (1), for example.

[Math. 1]

$$dp(U, v_T) = \sum_{u \in U} \sum_{e_r \in R_u} w_E(e_r, C) + \sum_{v_j \in M} w_V(v_j) \qquad \text{Equation (1)}$$

Here, a set of users is denoted by U, and a set of vertices and a set of edges of a graph G are respectively denoted by V and E. The input items are the departure point $s_u \in V$ of each user $u \in U$, the destination $v_T \in V$, and the graph G(V,E). The output item is a traveling route $R_u$ from the departure point $s_u \in V$ of each user $u \in U$ to the destination $v_T \in V$. The traveling route $R_u$ from the departure point to the destination is a sequence consisting of edge set elements $e_r \in E$, and the source and the target of the sequence are respectively denoted by $s_u$ and $v_T$. The cost required when users u in a group $C \subset U$ pass through the edge e is denoted by $w_E(e,C)$. A set of vertices $v_j \in V$ where groups join up on a route is denoted by M. The join cost required when groups join up at the vertex v is denoted by $w_v(v)$.

Since the process, in the processing described above, for deriving a meeting place and a route such that the sum of the travel costs of multiple users becomes minimum in consideration of benefit of confluence of multiple users is a publicly-known technology, the further description therefor will be omitted. Specific processing therefor is disclosed, for example, in the reference of "KAZUKI TAKISE (+2), 'Multi-user Routing to Single Destination with Confluence,' DEIM Forum 2016 D2-6". By adding, to the processing described in the reference, the process of adding the join cost of each user required for joining at a meeting place based on the transportation of the user, the processing of the present embodiment can be performed.

(Processing for Deriving New Meeting Place)

There will now be described the processing for deriving a new meeting place performed in the deriver 34. When there is a specific user who is thought to be unable to arrive at the formally set meeting place by the meeting time, the calculation unit 52 derives, for the meeting place provisionally set each time by the provisional setting unit 50, the travel cost of each user required for the traveling from the current position of the user through the meeting place to the destination, and newly calculates the sum of the travel costs and the join costs of the respective users.

Based on the multiple sums thus newly calculated, the formal setting unit 54 formally sets a new meeting place such that the travel cost required for the specific user to travel from the current position of the specific user to the new meeting place is higher than the travel cost required for each of the other users to travel from the current position of the user to the new meeting place.

More specifically, the processing describe above may be performed as follows. When there is a specific user, the calculation unit 52 derives an initial travel cost of each user required for the traveling from the departure point to the current position of the user. For the meeting place provisionally set each time by the provisional setting unit 50, the calculation unit 52 derives a first travel cost of each user obtained by multiplying the travel cost required for the traveling from the current position of the user to the meeting place by a coefficient based on the initial travel cost of the user, and a second travel cost of each user required for the traveling from the meeting place to the destination; thereafter, the calculation unit 52 newly calculates the sum of the first travel costs, the second travel costs, and the join costs of the respective users. The coefficient becomes larger when the initial travel cost of the user is higher. Thereafter, the formal setting unit 54 formally selects a new meeting place with the minimum sum.

This processing can reduce the new travel cost, required for the traveling to the new meeting place, of a user whose initial travel cost required for the traveling to the current position of the user is higher, and can increase the new travel cost of a user whose initial travel cost is lower. It is considered that, compared to the other users who have traveled to the meeting place or the vicinity thereof, the specific user has traveled for a smaller distance, so that the specific user's initial travel cost required for the traveling to the current position is lower. Therefore, the travel cost required for the specific user to travel from the current position of the specific user to the new meeting place becomes higher than the travel cost required for each of the other users to travel from the current position of the user to the new meeting place.

The processing for deriving a new meeting place as set forth above may be expressed as processing for minimizing an objective function $dp(U,v_T)$ defined by the following Equation (2), for example.

[Math. 2]

$$dp(U, v_T) = \sum_{u \in U} \sum_{e_r \in R_u} \alpha_C \times w_E(e_r, C) + \sum_{v_j \in M} w_V(v_j) \qquad \text{Equation (2)}$$

In Equation (2), ac is a coefficient determined according to the initial travel cost of each user required for the traveling from the departure point to the current position of the user. The coefficient $\alpha_c$ is set larger when the initial travel cost required for the traveling to the current position is higher.

Figure 7:
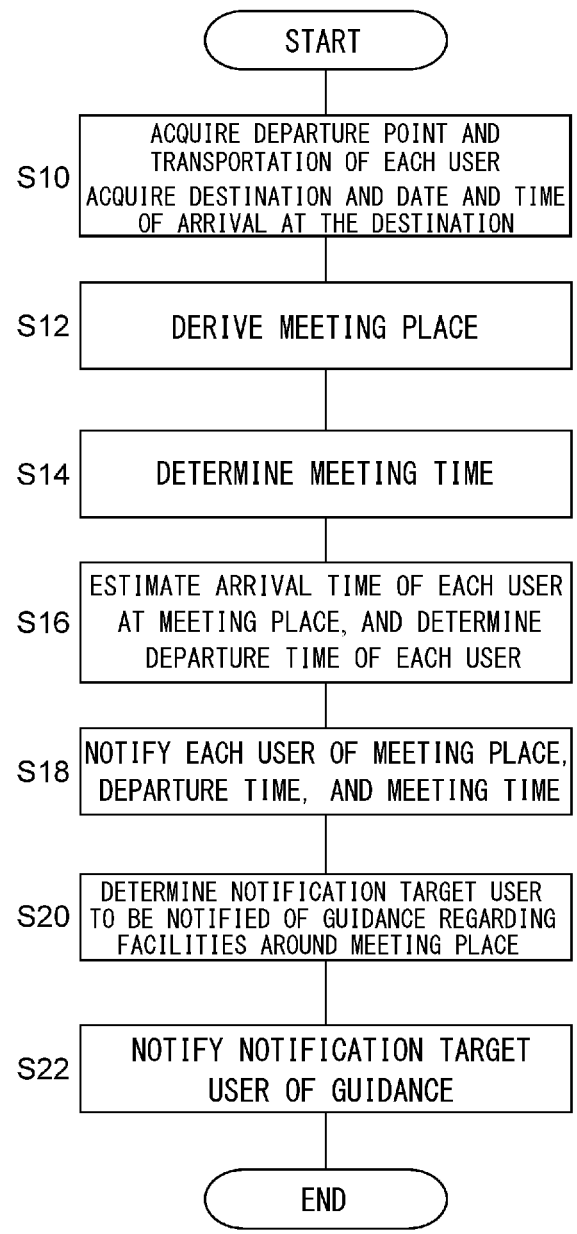
FIG. 7 is a flowchart that shows processing for deriving a meeting place and processing for providing a guidance notification, performed in the server device shown in FIG. 1.

There will now be described the overall operation of the information provision system 1 having the configuration set forth above. FIG. 7 is a flowchart that shows processing for deriving a meeting place and processing for providing a guidance notification, performed in the server device 20 shown in FIG. 1.

The acquirer 30 acquires the departure point and the transportation of each user and also acquires the destination and the date and time of arrival at the destination (S10). The deriver 34 derives a meeting place (S12) and determines the meeting time (S14). The estimator 36 estimates the arrival time of each user at the meeting place and determines the departure time of each user (S16). The notification unit 40 notifies each user of the meeting place, the departure time, and the meeting time (S18). The determination unit 38 determines a notification target user to be notified of guidance regarding facilities around the meeting place (S20). Accordingly, the notification unit 40 notifies the notification target user of the guidance (S22).

Figure 8:
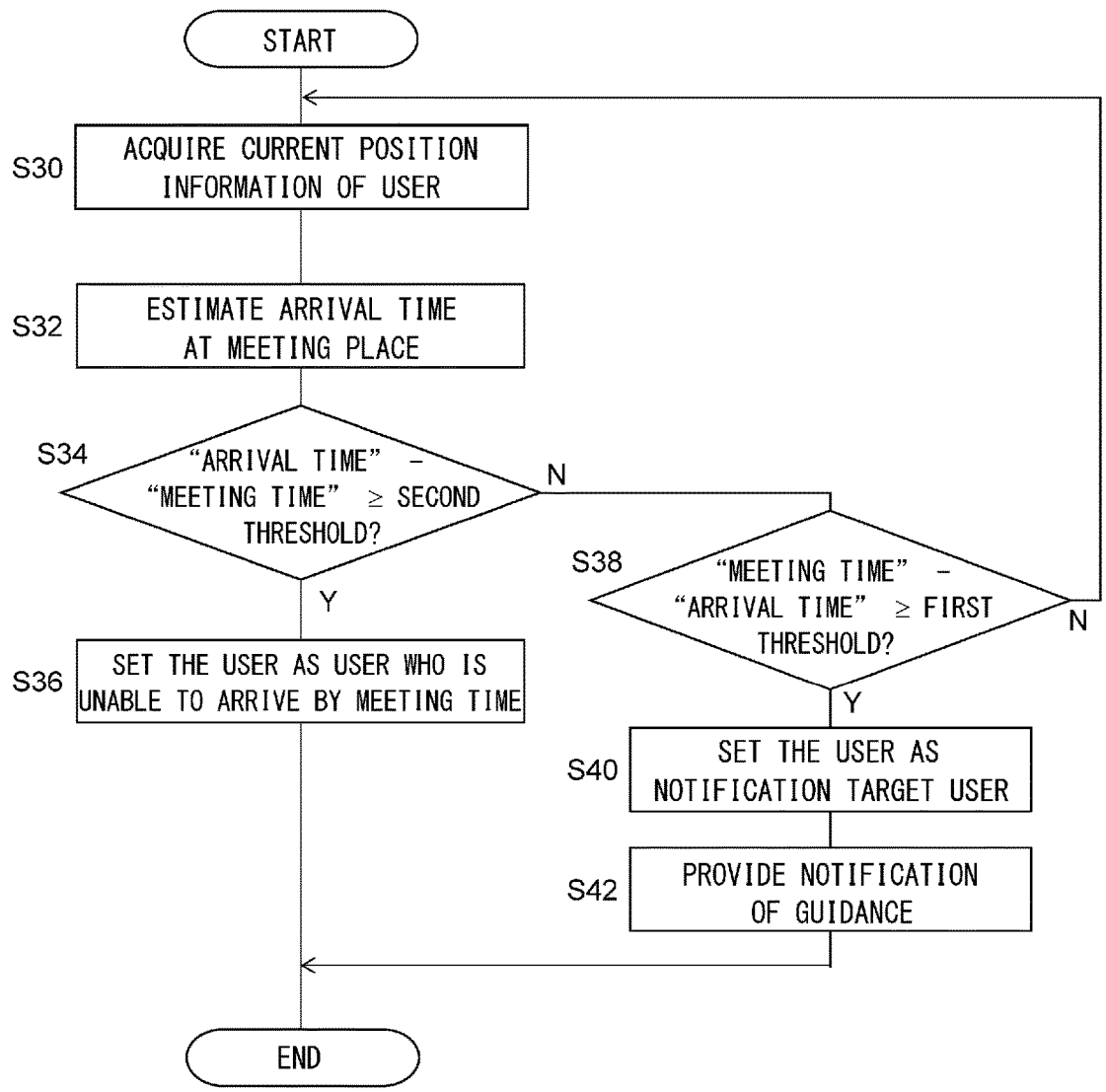
FIG. 8 is a flowchart that shows processing performed on the day of the meeting in the server device shown in FIG. 1.

FIG. 8 is a flowchart that shows processing performed on the day of the meeting in the server device 20 shown in FIG. 1. The processing shown in FIG. 8 is performed for each user. The position information acquirer 32 acquires the current position information of a user (S30). Based on the current position information, the estimator 36 estimates the arrival time of the user at the meeting place (S32). When "the arrival time"–"the meeting time"≥the second threshold (Y at S34), the determination unit 38 sets the user as a user who is unable to arrive by the meeting time (S36), and the processing is terminated.

When "the arrival time"–"the meeting time"<the second threshold (N at S34) and when "the meeting time"–"the arrival time"≥the first threshold (Y at S38), the determination unit 38 sets the user as a notification target user (S40), the notification unit 40 notifies the notification target user of the guidance (S42), and the processing is terminated. When "the meeting time"–"the arrival time"<the first threshold (N at S38), the process returns to the step S30.

FIG. 9 is a flowchart that shows processing for changing the meeting place, performed in the server device 20 shown in FIG. 1. When a user who is unable to arrive by the meeting time is not found (N at S50), the server device 20 waits. When there is a user who is unable to arrive by the meeting time (Y at S50), the position information acquirer 32 acquires the current position information of each user (S52). The calculation unit 52 calculates the initial travel cost of each user required for the traveling to the current position of the user (S54). The deriver 34 derives a new meeting place (S56). The estimator 36 then estimates the arrival time of each user at the new meeting place (S58). When "the latest arrival time"–"the earliest arrival time">the third threshold (Y at S60), the notification unit 40 does not provide notification of the new meeting place (S62), and the processing is terminated. When "the latest arrival time"–"the earliest arrival time"≤the third threshold (N at S60), the notification unit 40 provides notification of the new meeting place (S64), and the processing is terminated.

According to the present embodiment, the arrival time of each user at a meeting place is estimated and, based on the arrival time thus estimated, a notification target user to be notified of guidance regarding facilities around the meeting place is determined. Accordingly, a user who may arrive at the meeting place earlier can be notified of facilities where the user may comfortably wait for other users. Thus, the convenience of users who may arrive at the meeting place earlier can be improved.

When the time from the estimated arrival time of a user to the meeting time is the first threshold or greater, the user is set as a notification target user. Accordingly, a user who may wait for a relatively long time can be notified of facilities where the user may comfortably wait for other users.

A user whose transportation is by car is set as a notification target user, irrespective of the estimated arrival time. Accordingly, a user whose actual arrival time could greatly differ from the estimated arrival time can be notified of facilities where the user may comfortably wait for other users.

While a user is traveling toward the meeting place, the user's arrival time is estimated based on the current position information and the transportation of the user. Accordingly, even if a user leaves earlier on the day of the meeting, for example, and the user's arrival time could become earlier, such a user can also be notified of facilities where the user may comfortably wait for other users.

Also, the join cost of each user required for joining at the meeting place is derived based on the transportation of the user, and the sum of the travel costs and the join costs of the respective users is calculated. Accordingly, even when there is a user who uses different transportation, an appropriate meeting place can be derived.

A new meeting place is formally set such that the travel cost required for a specific user to travel from the current position of the specific user to the new meeting place is higher than the travel cost required for each of the other users to travel from the current position of the user to the new meeting place. Accordingly, a new meeting place can be derived such that a user who is expected to arrive at the original meeting place on time bears less burden.

Described above is an explanation based on exemplary embodiments. The embodiments are intended to be illustrative only, and it will be obvious to those skilled in the art that various modifications to a combination of constituting elements or processes could be developed and that such modifications also fall within the scope of the present disclosure.

For example, even when the time from the estimated arrival time of a user to the meeting time is the first threshold or greater, if the estimated arrival time is latest in the estimated arrival times of users, the determination unit 38 need not set the user as a notification target user. This can prevent notification, which could be unnecessary, to a user who may arrive last at the meeting place.

Although an example has been described in the embodiment in which the processing unit 24 is provided in the server device 20, the processing unit 24 may be provided in each of the vehicle-mounted devices 10 and the terminal devices 12. In this case, a vehicle-mounted device 10 or a terminal device 12 receives the departure point, transportation, and current position information of each of other users from other vehicle-mounted devices 10 or terminal devices 12, derives a meeting place, notifies other users of the meeting place, and notifies a notification target user of guidance regarding facilities around the meeting place. Instead of receiving the departure point, transportation, and current position information of each of other users from other vehicle-mounted devices 10 or terminal devices 12, the vehicle-mounted device 10 or terminal device 12 provided with the processing unit 24 may obtain the departure point and transportation of each of other users entered by a user. In this case, the vehicle-mounted device 10 or terminal device 12 may notify other users of the meeting place and may notify a notification target user of guidance regarding facilities around the meeting place, by means of e-mails or the likes. Also, information such as map data may be received by the vehicle-mounted device 10 or terminal device 12 from the server device 20, or may be stored in the storage unit 26 provided in the vehicle-mounted device 10 or terminal device 12. In this case, the vehicle-mounted device 10 or terminal device 12 functions as an information provision device. This modification allows greater flexibility in the configuration of the information provision system 1.

The derivation of a meeting place can also be applied to the situation where multiple users in the same place are to share a taxi to go home. More specifically, multiple users share a taxi to travel from the current position to another place where other taxies can be caught, for example, and the users separate at the place to get in other multiple taxies and travel to the respective destinations, such as their houses. In this situation, a meeting place may be derived by defining the destination of each user as the departure point, and the current position as the destination. The meeting place corresponds to the place where other taxies can be caught. The join cost of the place where other taxies can be caught may be set relatively low. By reversely traveling along the derived route, each user can travel from the current position to the user's destination through the place where other taxies can be caught. This modification enables search for a route such that users can share a taxi to go home, thereby reducing the taxi fare.

What is claimed is:

1. An information processing method, comprising:
  acquiring a departure point and transportation of each of a plurality of users and a destination in common;
  provisionally setting a meeting place a plurality of times;
  deriving, for the meeting place provisionally set each time, a travel cost of each user required for traveling from the departure point of the user through the meeting place to the destination, and a join cost of each user required for joining at the meeting place based on the transportation of the user, and calculating the sum of the travel costs and the join costs of the respective users,
  wherein for each transportation, the join cost required for joining at the meeting place unsuitable for meeting is set larger than the join cost required for joining at the meeting place suitable for meeting;
  formally setting a meeting place based on a plurality of calculated sums;
  acquiring current position information of the plurality of users;
  deriving, when there is a specific user thought to be unable to arrive at the meeting place formally set by a predetermined meeting time, for the meeting place provisionally set each time in the provisionally setting, the travel cost of each user required for traveling from the current position of the user through the meeting place to the destination, and newly calculating the sum of the travel costs and the join costs of the respective users; and
  formally setting, based on a plurality of sums newly calculated, a new meeting place such that the travel cost required for the specific user to travel from the current position of the specific user to the new meeting place is higher than the travel cost required for each of the other users to travel from the current position of the user to the new meeting place.

2. An information processor, comprising:
  an acquirer configured to acquire a departure point and transportation of each of a plurality of users and a destination in common;
  a provisional setting unit configured to provisionally set a meeting place a plurality of times;
  a calculation unit configured to derive, for the meeting place provisionally set each time, a travel cost of each user required for traveling from the departure point of the user through the meeting place to the destination, and a join cost of each user required for joining at the meeting place based on the transportation of the user, and to calculate the sum of the travel costs and the join costs of the respective users,
  wherein for each transportation, the join cost required for joining at the meeting place unsuitable for meeting is set larger than the join cost required for joining at the meeting place suitable for meeting;
  a formal setting unit configured to formally set a meeting place based on a plurality of calculated sums;
  a position information acquirer configured to acquire current position information of the plurality of users, wherein:
  when there is a specific user thought to be unable to arrive at the meeting place formally set by a predetermined meeting time, the calculation unit derives, for the meeting place provisionally set each time by the provisional setting unit, the travel cost of each user required for traveling from the current position of the user through the meeting place to the destination, and newly calculates the sum of the travel costs and the join costs of the respective users; and
  the formal setting unit formally sets, based on a plurality of sums newly calculated, a new meeting place such that the travel cost required for the specific user to travel from the current position of the specific user to the new meeting place is higher than the travel cost required for each of the other users to travel from the current position of the user to the new meeting place.

3. The information processing method of claim 1, wherein when the transportation is by car, the meeting place unsuitable for meeting is a place where parking and stopping of the car is impossible or difficult.

4. The information processing method of claim 1, wherein when the transportation is by car, the join cost required for joining at the meeting place with a parking area is set lower if the parking fee per unit time of the parking area is lower.

5. The information processing method of claim 1, wherein when the transportation is by train, the meeting place suitable for meeting includes a station, commercial facilities near a station, and a landmark.

6. The information processor of claim 2, wherein when the transportation is by car, the meeting place unsuitable for meeting is a place where parking and stopping of the car is impossible or difficult.

7. The information processor of claim 2, wherein when the transportation is by car, the join cost required for joining at the meeting place with a parking area is set lower if the parking fee per unit time of the parking area is lower.

8. The information processor of claim 2, wherein when the transportation is by train, the meeting place suitable for meeting includes a station, commercial facilities near a station, and a landmark.

* * * * *